(12) United States Patent
Naito

(10) Patent No.: US 8,486,799 B2
(45) Date of Patent: Jul. 16, 2013

(54) METHOD FOR MANUFACTURING SOLID ELECTROLYTIC CAPACITOR

(75) Inventor: Kazumi Naito, Tokyo (JP)

(73) Assignee: Showa Denko K.K., Tokyo (JP)

( * ) Notice: Subject to any disclaimer, the term of this patent is extended or adjusted under 35 U.S.C. 154(b) by 103 days.

(21) Appl. No.: 13/254,309

(22) PCT Filed: Mar. 2, 2010

(86) PCT No.: PCT/JP2010/001389
§ 371 (c)(1),
(2), (4) Date: Oct. 6, 2011

(87) PCT Pub. No.: WO2010/100888
PCT Pub. Date: Sep. 10, 2010

(65) Prior Publication Data
US 2012/0028433 A1    Feb. 2, 2012

(30) Foreign Application Priority Data
Mar. 2, 2009   (JP) ................................ 2009-047919

(51) Int. Cl.
*H01L 21/02* (2006.01)

(52) U.S. Cl.
USPC .................... 438/381; 438/393; 257/E21.008

(58) Field of Classification Search
USPC .......................... 438/381, 393; 257/E21.008
See application file for complete search history.

(56) References Cited

U.S. PATENT DOCUMENTS

| | | | | |
|---|---|---|---|---|
| 5,473,503 A * | 12/1995 | Sakata et al. | ................... | 361/525 |
| 5,586,000 A | 12/1996 | Sakata et al. | | |
| 6,042,740 A * | 3/2000 | Uehara et al. | ................. | 252/62.2 |
| 6,210,450 B1 * | 4/2001 | Fukaumi et al. | ............. | 29/25.03 |
| 8,058,135 B2 * | 11/2011 | Merker et al. | ................. | 438/393 |
| 2005/0030678 A1 * | 2/2005 | Taketani et al. | ................. | 361/15 |
| 2006/0084237 A1 * | 4/2006 | Kobayashi | ..................... | 438/381 |
| 2009/0147446 A1 * | 6/2009 | Sugawara et al. | ............. | 361/525 |

FOREIGN PATENT DOCUMENTS

| | | |
|---|---|---|
| JP | 63-002132 B2 | 1/1988 |
| JP | 01-232714 A | 9/1989 |
| JP | 07-235455 A | 9/1995 |
| JP | 2003-059338 A | 2/2003 |
| JP | 2004-193403 A | 7/2004 |
| JP | 2004-335630 A | 11/2004 |
| JP | 2006-140142 A | 6/2006 |
| JP | 2007-150152 A | 6/2007 |
| JP | 2008-047660 A | 2/2008 |

\* cited by examiner

*Primary Examiner* — Trung Q Dang

(74) *Attorney, Agent, or Firm* — Sughrue Mion, PLLC

(57) ABSTRACT

A dielectric layer is formed in the surface of an anode body which is composed of a sintered body, a semiconductor layer composed of an electrically-conductive polymer is formed on the dielectric layer, and then an electric conductor layer is formed on the semiconductor layer with an electrically-conductive paste which contains a dispersant to obtain a solid electrolytic capacitor element: The electric conductor layer of the solid electrolytic capacitor element is electrically connected to a cathode terminal using the electrically-conductive paste which contains a dispersant, and the anode body is electrically connected to an anode terminal through a lead wire by welding. The solid electrolytic capacitor element connected to the terminals is immersed in a solvent, and then the solid electrolytic capacitor element is encapsulated with a resin to obtain a solid electrolytic capacitor.

19 Claims, 2 Drawing Sheets

METHOD FOR MANUFACTURING SOLID ELECTROLYTIC CAPACITOR

CROSS REFERENCE TO RELATED APPLICATIONS

This application is a National Stage of International Application No. PCT/JP2010/001389 filed Mar. 2, 2010, claiming priority based on Japanese Patent Application No. 2009-047919 filed Mar. 2, 2009, the contents of all of which are incorporated herein by reference in their entirety.

TECHNICAL FIELD

The present invention relates to a method for manufacturing a solid electrolytic capacitor, in which an equivalent series resistance (hereafter, it might be written as ESR) is hardly raised in a solid electrolytic capacitor element, even if the solid electrolytic capacitor element is encapsulated by a resin melted at high temperature.

BACKGROUND ART

A solid electrolytic capacitor encapsulated with a resin is manufactured by a method which one or not less than two solid electrolytic capacitor elements are arranged on a lead frame and then the solid electrolytic capacitor elements are dipped in the resin solution, a method which transfer molding is carried out using a melted resin, or the like. The dipping method in the resin solution provides a thin resin capsule, which is likely to cause a pinhole and low dimensional accuracy. On the other hand, the transfer molding method, in comparison to the dipping method, gives a molded product having fleshier and complex shape, with uniform quality, and high dimensional accuracy, short hardening time, and fewer burrs, and post handling is easier. Therefore, the transfer molding method is adopted in many cases of manufacturing a large amount of solid electrolytic capacitors.

However, pressure and calories applied to the solid electrolytic capacitors from a melted resin are high in the transfer molding method. Therefore, in encapsulation with the resin by the transfer molding method, deterioration of the solid electrolytic capacitor element might occur and then ESR might rise. Solid electrolytic capacitors with small value of ESR are used in recent years. A little rise of ESR cannot be overlooked in a design of an electronics device.

As a method of reducing level of ESR, for example, patent document 1 discloses a method for manufacturing a solid electrolytic capacitor anode body, wherein the method comprises the steps of: mixing a valve action metal powder, a solid water soluble binder and an organic solvent soluble binder in an organic solvent, granulating the mixture; forming a molded article so as to plant an anode lead on the granulated object; washing the molded article with a solvent to remove the binder in the molded article, and sintering the molded article in high temperature and vacuum. In patent document 1, it is described that using this anode body provides a solid electrolytic capacitor having a small level and variation in tan δ and ESR and being improved in a leakage current characteristic.

Patent document 2 discloses a method for manufacturing a solid electrolytic capacitor, wherein the method comprises the steps of: winding an anode foil and a cathode foil through a separator to prepare a winding element; immersing the winding element in a solvent capable of dissolving at least one component of the separator to decrease the weight of the separator; and then forming a solid electrolyte layer in the winding element.

Patent document 3 discloses a method for manufacturing a solid electrolytic capacitor, wherein the method comprises the steps of winding a anode foil having oxide layers on their surfaces and a cathode foil through a separator to obtain a capacitor element, sequentially dipping the capacitor element in an oxidizing reagent solution and a polymerizable monomer solution, and then chemically polymerizing the polymerizable monomer to form an electrically-conductive polymer layer in a capacitor element, in which the solvent of the polymerizable monomer solution is an ionic liquid, the ionic liquid in the capacitor element is dissolved and removed by immersing the capacitor element in a solvent capable of dissolving the ionic liquid after the forming step of the electrically-conductive polymer. In patent document 3, it is described that this manufacture method can provide a solid electrolytic capacitor having a high appearance ratio of an electrostatic capacitance, a high electric capacitance, and a low leakage current.

Patent document 4 discloses a method for manufacturing a solid electrolytic capacitor, wherein the method comprises the steps of: setting up a layer of silicone resin or a silicone oil on a solid electrolytic capacitor element comprising an anode body, a dielectric layer, a carbon graphite layer and a silver paste layer, immersing the element in an organic solvent such as acetone and toluene or optionally with vibration to remove the silicone layer on the surface, then setting up a encapsulating resin layer. In patent document 4, it is described that this manufacture method can improve a moisture resistance of the solid electrolytic capacitor, resulting in reducing deterioration in an electrostatic capacity change ratio and a dielectric tangent.

PRIOR ART LITERATURES

Patent Documents

Patent document 1: JP 2004-335630 A
Patent document 2: JP 2004-193403 A
Patent document 3: JP 2008-47660 A
Patent document 4: JP 63-2132 B

SUMMARY OF THE INVENTION

Problems to be Resolved by the Invention

However, in the manufacture method described in these patent documents, it was difficult to obtain a solid electrolytic capacitor having ESR as low as designed value, since ESR of the solid electrolytic capacitor element rises by the heat applied in the time when the solid electrolytic capacitor element is encapsulated by a resin (resin-sealed).

An object of the present invention is to provide a method of manufacturing a solid electrolytic capacitor in which an ESR is hardly raised in a solid electrolytic capacitor element even if the solid electrolytic capacitor element is encapsulated with a resin melted at high temperature.

Means for Resolving the Problems

As a result of the study zealously to achieve the above-mentioned object, the present inventor has found that a solid electrolytic capacitor, in which an ESR hardly raised in a solid electrolytic capacitor element even if the solid electrolytic capacitor element is encapsulated with a resin melted at high temperature, can be manufactured by immersing the solid electrolytic capacitor element in a solvent after forming an electric conductor layer using an electrically-conductive paste which contains a dispersant or after electrically connecting the electric conductor layer of the solid electrolytic capacitor element to the cathode terminal using an electrically-conductive paste which contains a dispersant. The present invention has been completed by the more detailed study on the basis of this finding.

That is, the present invention is the following.

(1) A method for manufacturing a solid electrolytic capacitor, in which the method comprises the steps of:
forming a dielectric layer in a surface of an anode body,
forming a semiconductor layer on the dielectric layer,
forming an electric conductor layer on the semiconductor layer using an electrically-conductive paste which contains a dispersant to obtain a solid electrolytic capacitor element,
immersing the solid electrolytic capacitor element in a solvent;
electrically connecting the electric conductor layer to a cathode terminal before or after the immersing step; and then
encapsulating the solid electrolytic capacitor element using a resin.

(2) A method for manufacturing a solid electrolytic capacitor, in which the method comprises the steps of:
forming a dielectric layer in a surface of an anode body,
forming a semiconductor layer on the dielectric layer,
forming an electric conductor layer on the semiconductor layer to obtain a solid electrolytic capacitor element,
electrically connecting the electric conductor layer to a cathode terminal using an electrically-conductive paste which contains a dispersant,
immersing the solid electrolytic capacitor element connected to the cathode terminal in a solvent; and then
encapsulating the solid electrolytic capacitor element using a resin.

(3) The method for manufacturing a solid electrolytic capacitor according to (1) or (2), wherein the solvent used in the immersing step does not dissolve nor swell a binder contained in the electrically-conductive paste.

(4) The method for manufacturing a solid electrolytic according to (1) or (2), wherein the solvent used in the immersing step is alcohol.

(5) A method for manufacturing a solid electrolytic capacitor, in which the method comprises the steps of:
forming a dielectric layer in a surface of an anode body,
forming a semiconductor layer on the dielectric layer,
forming an electric conductor layer on the semiconductor layer using an electrically-conductive paste which contains a dispersant to obtain a solid electrolytic capacitor element,
electrically connecting the electric conductor layer to a cathode terminal with an electrically-conductive paste,
encapsulating the solid electrolytic capacitor element with a resin, and
adjusting the amount of a dispersant which remains in the electric conductor layer to less than 700 mass ppm, after the electric conductor layer forming step using the electrically-conductive paste which contains a dispersant or the electrically connecting step with the electrically-conductive paste which contains a dispersant and before the encapsulating step.

(6) The method for manufacturing a solid electrolytic capacitor according to any one of (1) to (5), wherein the electric conductor layer includes a layer obtained by using electrically-conductive carbon paste and a layer obtained by using silver paste containing the dispersant.

(7) The method for manufacturing a solid electrolytic capacitor according to any one of (1) to (6), wherein the electrically-conductive paste comprises electrically-conductive powder and vehicle.

(8) The method for manufacturing a solid electrolytic capacitor according to (7), wherein the vehicle contains a binder.

(9) The method for manufacturing a solid electrolytic capacitor according to (8), wherein the binder is a methacrylic resin.

(10) The method for manufacturing a solid electrolytic capacitor according to any one of (1) to (9), wherein the dispersant contains a higher fatty acid compound.

(11) A solid electrolytic capacitor obtained by the manufacture method according to any one of (1) to (10).

Advantageous Effects of the Invention

The method for manufacturing a solid electrolytic capacitor of the present invention can give a solid electrolytic capacitor in which an ESR is hardly raised in a solid electrolytic capacitor element even if the solid electrolytic capacitor element is encapsulated by a resin melted at high temperature. As a result, the solid electrolytic capacitor which is encapsulated by the resin and has an ESR as low as designed value can be manufactured.

EMBODIMENT FOR CARRYING OUT THE INVENTION

Figure 1:
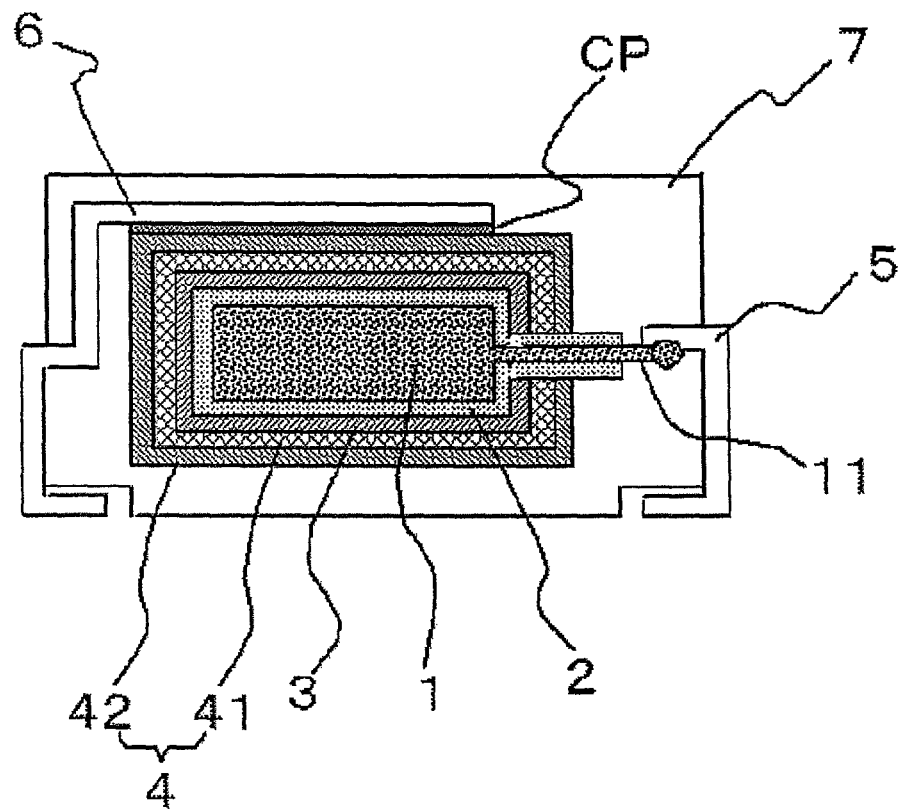
[FIG. 1] a cross-sectional drawing for explanation of a solid electrolytic capacitor as one embodiment obtained by the manufacture method of the present invention.
Figure 2:
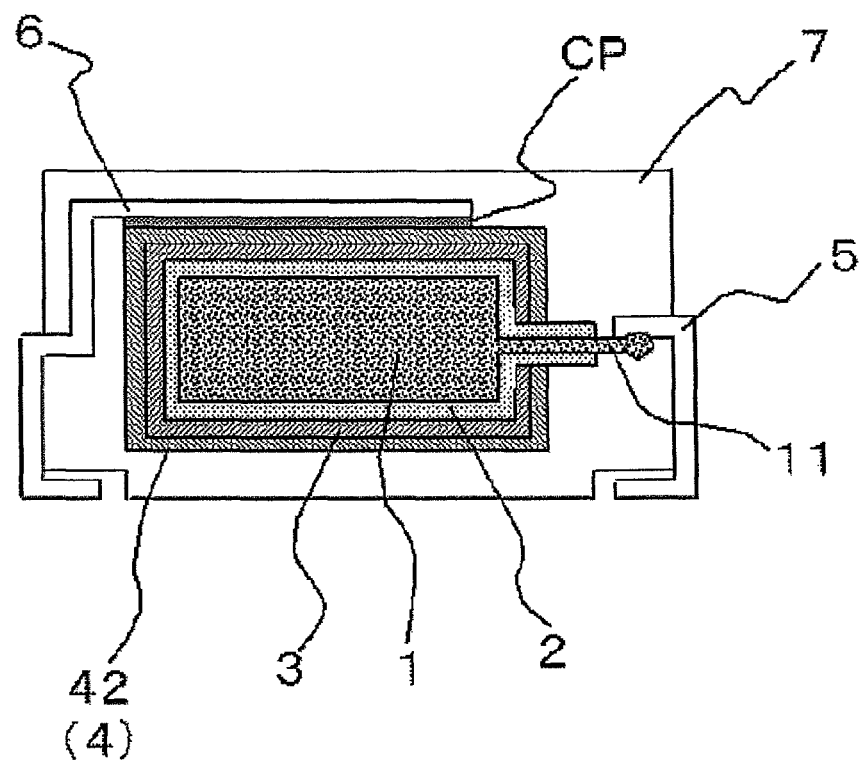
[FIG. 2] a cross-sectional drawing for explanation of a solid electrolytic capacitor as other embodiment obtained by the manufacture method of the present invention.

The manufacture method of the present invention is explained in reference to the drawings where the solid electrolytic capacitor according to the embodiment is shown. The solid electrolytic capacitor obtained by the manufacture method of the present invention is not limited to the embodiments below, and it can be enforceable with change properly within the range where the feature of the present invention is not changed. FIG. 1 and FIG. 2 are cross-sectional drawings for explanation of solid electrolytic capacitor as embodiments obtained by the manufacture method of the present invention. The solid electrolytic capacitor comprises a solid electrolytic capacitor element, an anode terminal and a cathode terminal which are sealed with an encapsulation resin.

In the method for manufacturing a solid electrolytic capacitor of the present invention, the solid electrolytic capacitor element is manufactured at first.

The solid electrolytic capacitor element is obtained by forming the dielectric layer 2 in the surface of the anode body 1, forming the semiconductor layer 3 on the dielectric layer 2, and then forming the electric conductor layer on the semiconductor layer 3.

The anode body used for the present invention is preferably made from a valve action metal such as tantalum, aluminum, niobium, titanium or the like, or from an alloy of which a principal ingredient is such a valve action metal. The anode body is especially preferably a sintered compact of the valve action metal powder or the alloy powder. The sintered compact is preferably a porous body. Moreover, concerning the anode body 1 shown in FIG. 1 and FIG. 2, the lead wire 11 is extended from the anode body.

In the manufacture method of the present invention, the dielectric layer is formed in the surface of the anode body at first. A chemical formation treatment is executed for the generation of the dielectric layer. An oxide is generated in the surface of the anode body by this chemical formation treatment. This oxide layer is the dielectric layer. A general method of the electrolytic formation can be used for the chemical formation treatment.

The semiconductor layer 3 is formed on the dielectric layer. The semiconductor layer preferably comprises an electrically-conductive polymer. Examples of the electrically-conductive polymer include polythiophene derivatives, polyphenylene vinylene derivatives, polypyrrole derivatives, polyaniline derivatives, polyacetylene derivatives, polyphenylene derivatives, polyisothianaphthene derivatives and the like. In the present invention, the electrically-conductive polymer is suitable in the case where the electrically-conductive polymer contains a polymer having a conjugated double bond, and especially suitable in the case where the electrically-conductive polymer contains a polymer having polythiophene structure. The electrically-conductive polymer can be used alone or in combination of two or more. The electrically-conductive polymer usually contains a dopant. The dopant can be selected from dopants which are generally used for an electrically-conductive polymer for a solid electrolytic capacitor. Sulfonic acid compound is preferable as the dopant from a viewpoint that a solid electrolytic capacitor with an excellent property can be obtained. Either an electropolymerization method or a chemical oxidative polymerization method can be used for formation of the electrically-conductive polymer. Restoration chemical formation (re-chemical formation) may be executed during the formation of the semiconductor layer or after the formation of the semiconductor layer. The method of the electrolytic formation generally executed can be used for the restoration chemical formation.

In FIG. 1 and FIG. 2, the dielectric layer 2 and the semiconductor layer 3 are shown as they are formed only on the outer surface of the anode body 1. The dielectric layer and the semiconductor layer are also formed on a surface of fine pores in a porous body in the case where the anode body is the porous body.

Next, the electric conductor layer 4 is formed so that the surface of the semiconductor layer 3 is covered.

An electrically-conductive paste is usually used for the formation of the electric conductor layer. In FIG. 1, the carbon layer 41 is set up on the semiconductor layer 3 using the electrically-conductive carbon paste, and then the silver layer 42 is set up on the carbon layer 41 using the silver paste. In FIG. 2, the carbon layer 41 is not set up, and only the silver layer 42 is set up using the silver paste so that the surface of the semiconductor layer 3 is covered.

An electrically-conductive paste comprises an electrically-conductive powder and a vehicle as a principal ingredient. Examples of the electrically-conductive powder include an electrically-conductive carbon such as graphite, acetylene black, KETJENBLACK (electrically-conductive carbon black manufactured by Ketjen Black International Company), carbon nanotube, carbon nanofiber, vapor-grown carbon fiber (VGCF) and the like; metal powder such as silver powder, copper powder and the like. A dispersant has been often added to these electrically-conductive powders to keep dispersibility. Among these electrically-conductive pastes, the silver paste is preferably used. Elements such as Au, Cu, Al, Ti, Pd, Ni, V, Ta, W, Mo, Cr, Ru, Mg and the like may be contained in the silver powder, which is the principal ingredient of the silver paste, besides Ag element. An solid electrolytic capacitor having an excellent tolerance for electro migration and stress migration may be obtained if the silver powder contains these elements.

The vehicle, which is the other principal ingredient of the electrically-conductive paste, is preferably the one which is obtained by mixing the binder and the solvent as needed. Examples of the binder include methacrylic resin, acrylic resin, ethyl cellulose and the like. Moreover, thermosetting resin and photosensitive resin can be used as the binder. Among these, the methacrylic resin is preferably used in the present invention.

Examples of the solvent include terpineol, xylene, kerosene, butyl carbitol, acetic esters and the like.

The electrically-conductive paste is spread on a prescribed part, and the solvent is removed to solidify the electrically-conductive paste.

Since, the electrically-conductive powder used for an electrically-conductive paste has a size of nano scale or micron scale, a dispersant is added so as to avoid cohesion of the electrically-conductive powder in the paste. For example, higher fatty acid compound such as palmitinic acid, stearic acid, oleic acid and the like is used as the dispersant.

Figure 3:
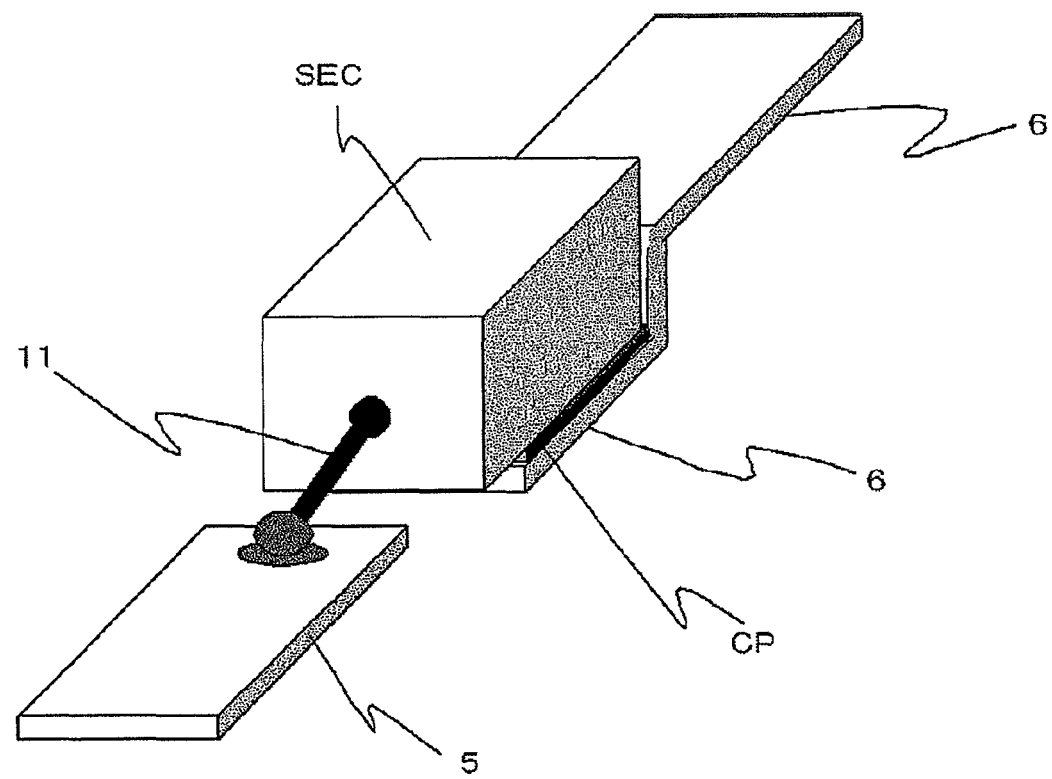
[FIG. 3] an explanation drawing showing a state that a solid electrolytic capacitor element is connected to a lead frame.

Usually, as for the solid electrolytic capacitor element obtained by the above-mentioned method, the anode terminal 5 is electrically connected to the lead wire 11 extended from the anode body 1, and the cathode terminal 6 is electrically connected to the electric conductor layer 4 (See FIG. 3). A usual lead frame can be used for fixing the cathode terminal and the anode terminal.

A welding, a bonding by an electrically-conductive paste or the like is usually used for the electrical connection of the lead wire and the anode terminal. Moreover, a bonding by an electrically-conductive paste such as the silver paste is usually used for the electrical connection of the electric conductor layer and the cathode terminal. As an electrically-conductive paste used for the electrical connections, mentioned are the electrically-conductive paste as described above.

In the manufacture method of the present invention, the dispersant which remains in the electric conductor layer has been decreased to less than 700 mass ppm, preferably to 20 mass ppm or less after forming the electric conductor layer by using the electrically-conductive paste which contains the dispersant or after electrically connecting the electric conductor layer of the solid electrolytic capacitor element to the cathode terminal by using the electrically-conductive paste which contains the dispersant and before encapsulation using a resin. The ratio of the remaining dispersant is a ratio based on the electric conductor layer in which the dispersant is included (or was included).

A method for adjusting the ratio of the remaining dispersant is not especially limited. In an embodiment of the manufacture method of the present invention, after forming the electric conductor layer by using the electrically-conductive paste which contains the dispersant or after electrically connecting the electric conductor layer of the solid electrolytic capacitor element to the cathode terminal by using the electrically-conductive paste which contains the dispersant and before encapsulation using the resin, the solid electrolytic capacitor element or the solid electrolytic capacitor element connected to the cathode terminal is immersed in a solvent. The ratio of the remaining dispersant can be adjusted by this solvent immersion.

The solvent used for the immersion is not especially limited as long as it can dissolve the dispersant. Examples of the solvent include aliphatic hydrocarbon such as pentane, hexane, heptane and the like; halogenated hydrocarbon such as dichloromethane, chloroform, carbon tetrachloride and the like; alicyclic hydrocarbon such as cyclohexane and the like; aromatic hydrocarbon such as benzene, toluene, xylene, ethyl benzene and the like; alcohol such as methanol, ethanol, butanol and the like; ketone such as acetone, methyl ethyl ketone, cyclohexanone and the like; nitrile solvent such as acetonitrile, propionitrile and the like; ether such as diethyl ether, dioxane, tetrahydrofuran and the like; amid solvent such as N,N-dimethyl formamide, N,N-dimethyl acetamide, N-methyl pyrrolidone and the like; sulfoxide such as dimethylsulfoxide and the like. The solvent used for the immersion is preferably the one which can not dissolve nor swell the binder which is comprised in the electrically-conductive paste, especially preferably alcohol.

The temperature of the solvent at the immersion is not especially limited. The temperature of the solvent is preferably 60° C. to 160° C., more preferably 70° C. to 120° C. In a case where a solvent having a low boiling point at normal pressure is used, pressurization can be executed in order to immerse in the solvent at the temperature of not less than the boiling point.

The immersion time is not especially limited. The immersion time is preferably ten minutes to ten hours. This immersion removes solvent dissoluble ingredient which is remained in the electric conductor layer 4 obtained by using electrically-conductive paste or in the electrical connecting layer CP between the cathode terminal and the electric conductor layer obtained by using electrically-conductive paste. The solvent dissoluble ingredient is mainly the dispersant having been contained in the electrically-conductive paste. This dispersant is necessary to improve dispersibility of the electrically-conductive powder in the electrically-conductive paste. However, this dispersant becomes needless after forming the electric conductor layer in the solid electrolytic capacitor element or the electrical connecting layer between the cathode terminal and the electric conductor layer.

After completing the immersion, the solid electrolytic capacitor element is taken out of the solvent, and then the solvent is removed by drying. In the manufacture method of the present invention, the operation from the immersion to the drying can be repeated several times. The immersion can be executed either after forming the electric conductor layer by using the electrically-conductive paste or after electrically connecting the electric conductor layer of the solid electrolytic capacitor element to the cathode terminal by using the electrically-conductive paste. Moreover, the immersion can be executed both after the forming and after the connecting.

Next, a resin encapsulation is executed so as to extend the anode terminal 5 and the cathode terminal 6 to outside. An injection molding method or a transfer molding method is usually used as the method of the resin encapsulation. Well-known electric insulating resin such as epoxy resin and polyimide resin is used as the encapsulation resin.

Thus, a resin encapsulated solid electrolytic capacitor is obtained. The solid electrolytic capacitor can be subjected to an aging treatment if necessary. The solid electrolytic capacitor obtained by the manufacture method of the present invention can be used by being mounted on various electric circuits or electronic circuits.

In the manufacture method of the present invention, it's not known exactly why the solid electrolytic capacitor can be manufactured with almost no raising ESR of the solid electrolytic capacitor element even if the solid electrolytic capacitor element is encapsulated with resin melted at high temperature. However, the present inventor guesses as follows.

Since the dispersant (higher fatty acid compound) contained in the electrically-conductive paste is a high boiling point material, the dispersant can be not removed at the temperature of when the paste is solidified. In the case where the step of adjusting the ratio of the remaining dispersant in the manufacture method of the present invention such as immersing the solid electrolytic capacitor element in the solvent was not executed, almost all of the dispersant which has been contained in the electrically-conductive paste may remain in the solid electrolytic capacitor element. Since a melted resin having high temperature is poured into a mold in the resin encapsulation, the solid electrolytic capacitor element is exposed to the high-temperature state at the time of encapsulation by the resin. Moreover, since the molded resin is cured at the high temperature approximating the glass transition temperature after being taken out of the mold, the solid electrolytic capacitor element is exposed to the high-temperature state for several hours at that time. It is considered that the remaining dispersant evaporates and then exudes to a surface of the electric conductor layer or adheres to a surface of the cathode terminal at such time when a solid electrolytic capacitor element is in the high-temperature state, increasing a contact resistance at an interface between the semiconductor layer and the electric conductor layer or an interface between the electric conductor layer and the cathode terminal and boosting an ESR. As previously mentioned, the dispersant contained in the electrically-conductive paste is removed in the step of immersing the solid electrolytic capacitor element in the solvent. As the result, it is guessed that an ESR doesn't rise at the time of encapsulating by the resin.

EXAMPLES

The method for manufacturing a solid electrolytic capacitor of the present invention will be explained by enumerating examples of the present invention. However, the present invention is not limited to the following examples. And the present invention is enforceable by changing properly within the range where the gist of the present invention is not changed.

Example 1

An oxide film (dielectric layer) was generated in a surface of a sintered body by chemical formation of the sintered body composed of tantalum powder in a phosphoric acid aqueous solution. Then, ethylenedioxy thiophene as monomer and anthraquinone sulfonic acid as dopant were transfused in the sintered body, and electrolytic polymerization was conducted to form a semiconductor layer composed of polythiophene derivative doped with anthraquinone sulfonic acid on the dielectric layer.

Thereafter, an electrically-conductive carbon paste and a silver paste (manufactured by Fukuda Metal Foil & POWDER Co. LTD., the silver paste contains a primary ingredient composed of 94% by mass of silver powder Ag—C252 and 6% by mass of methyl methacrylate resin. Oleic acid and stearic acid were detected as a dispersant.) were laid in turn on the semiconductor layer to form an electric conductor layer. Consequently a solid electrolytic capacitor element having a size of 0.95 mm in length, 0.63 mm in width and 0.53 mm in height and embedding a tantalum lead wire being 0.15 mmϕ was obtained.

A lead frame was separately prepared, which had 38 pairs of a convex portion (0.63 mm in width) which was a pair of an anode terminal and a cathode terminal was arranged in parallel with 3.4 mm in pitch and 0.1 mm in terminal interval on one piece of the lead frame, in which the lead frame was made of copper base alloy (trade name C1511H) whose thickness is 0.1 mm, and which was nickel-plated in thickness of 0.7±0.3 μm as foundation and was tin-plated in thickness of 5±2 μm as facing. The tantalum lead wire and a 0.63 mm×0.95 mm face of the solid electrolytic capacitor element were put on a pair of a convex portion of the lead frame respectively.

The tantalum lead wire was electrically and mechanically connected to the lead frame by the resistance welding. Moreover, the 0.63 mm×0.95 mm face was electrically and mechanically connected to the lead frame by drying and hardening of the silver paste (manufactured by Fukuda Metal Foil & POWDER Co. LTD., RM1011; Oleic acid and stearic acid were detected as a dispersant).

Next, the solid electrolytic capacitor element connected to the lead frame was immersed in ethyl alcohol at 70° C. for 20 minutes (first immersion). The solid electrolytic capacitor element was taken out of ethyl alcohol, and was dried at 100° C. for 20 minutes. In addition, the solid electrolytic capacitor element was immersed in another ethyl alcohol at 70° C. for 10 minutes (second immersion). The solid electrolytic capacitor element was taken out of ethyl alcohol, and was dried at 100° C. for 20 minutes.

The solid electrolytic capacitor element which passed through the immersion step was put on a prescribed position of a molding die. Transfer molding was conducted by epoxy resin at 172° C. Then, the resin was cured by heating at 187° C. for 5 hours. After the resin sealing, a relay terminal was formed by cutting and bending the lead frame into a prescribed size. An aging treatment was lastly conducted to obtain a chip-shaped solid electrolytic capacitor which has a size of 1.6 mm×0.8 mm×0.8 mm, capacity of 15 μF and rated voltage of 6.3 V.

1520 chip-shaped solid electrolytic capacitors were prepared by the same method as previously described.

(Measurement of ESR in Solid Electrolytic Capacitor)

ESR of 60 solid electrolytic capacitor elements before sealing by a resin were measured at 100 kHz, and a mean value thereof was calculated. Then, ESR of 1520 chip-shaped solid electrolytic capacitors after sealing by the resin was measured at 100 kHz, and a mean value thereof was calculated. The results are shown in Table 1.

TABLE 1

|  | Examples | | | | | Comp. Ex. |
| --- | --- | --- | --- | --- | --- | --- |
|  | 1 | 2 | 3 | 4 | 5 | 1 |
| Solvent immersion | | | | | | |
| Solvent of 1st immersion | ethanol | ethanol | ethanol | ethanol | ethanol | — |
| 1st immersion time (min.) | 20 | 30 | 60 | 180 | 480 | — |
| Solvent Temperature in 1st immersion (° C.) | 70 | 70 | 70 | 70 | 70 | — |
| Solvent of 2nd immersion | ethanol | ethanol | ethanol | ethanol | ethanol | — |
| 2nd immersion Time(min.) | 10 | 10 | 10 | 10 | 10 | — |
| Solvent Temperature in 2nd immersion (° C.) | 70 | 70 | 70 | 70 | 70 | — |
| Remaining amount of dispersant (ppm) | 680 | 150 | 20 | 0 | 0 | 1200 |
| ESR before sealing by resin (mΩ) | 52 | 55 | 48 | 56 | 52 | 49 |
| ESR after sealing by resin (mΩ) | 65 | 62 | 51 | 55 | 50 | 86 |

Examples 2-5

Chip-shaped solid electrolytic capacitors were obtained in the same manner as in Example 1 except that solvent immersion was executed on conditions as shown in Table 1. ESR was measured at 100 kHz in the same manner as in example 1. The results are shown in Table 1.

Comparative Example 1

Chip-shaped solid electrolytic capacitors were obtained in the same manner as in Example 1 except that solvent immersion was not executed. ESR was measured at 100 kHz in the same manner as in example 1. The results are shown in Table 1.

The remaining amount of the dispersant in the solid electrolytic capacitor element (a ratio of the remaining dispersant) was determined as follows.

The solid electrolytic capacitor element was immersed in 300 cm³ of ethyl alcohol at 70° C. for 480 hours, and then it was immersed in 300 cm³ of another ethyl alcohol at 70° C. for 10 minutes. The ethyl alcohol used for the immersion was analyzed and the amount of an extracted dispersant ($D_T$) was determined. A vaporized ethyl alcohol was gotten back by refluxing so as to maintain a solvent volume. The determined amount of the extracted dispersant ($D_T$) was considered as the amount of all dispersants contained in the solid electrolytic capacitor element.

Next, the amount (D) of the dispersant extracted by ethyl alcohol in the examples was determined. Then, the amount of dispersant remained in the solid electrolytic capacitor element was determined from difference ($D_T$–D) between the amount (D) and the amount ($D_T$) of the extracted dispersant. "Remaining Amount of dispersant (ppm)" in Table 1 is a ratio based on the mass of the silver paste layer of the solid electrolytic capacitor element, and is a mean value of measured value of 1520 solid electrolytic capacitors. Since oleic acid and stearic acid had been detected as the dispersant, the total amount of the oleic acid and the stearic acid was assumed to be the amount of the dispersant.

EXPLANATION OF CODES

| | |
|---|---|
| 1: | anode body |
| 2: | dielectric layer |
| 3: | semiconductor layer |
| 4: | electric conductor layer |
| 5: | anode terminal |
| 6: | cathode terminal |
| 7: | encapsulation resin |
| 11: | lead wire |
| 41: | carbon layer |
| 42: | silver layer |
| CP: | electrical connecting layer |
| SEC: | solid electrolytic capacitor element |

The invention claimed is:

1. A method for manufacturing a solid electrolytic capacitor, in which the method comprises the steps of:
    forming a dielectric layer in a surface of an anode body,
    forming a semiconductor layer on the dielectric layer,
    forming an electric conductor layer on the semiconductor layer with an electrically-conductive paste which contains a dispersant to obtain a solid electrolytic capacitor element,
    immersing the solid electrolytic capacitor element in a solvent;
    electrically connecting the electric conductor layer to a cathode terminal before or after the immersing step; and then
    encapsulating the solid electrolytic capacitor element with a resin.

2. The method for manufacturing a solid electrolytic capacitor according to claim 1, wherein the solvent used in the immersing step does not dissolve nor swell a binder contained in the electrically-conductive paste.

3. The method for manufacturing a solid electrolytic capacitor according to claim 1, wherein the solvent used in the immersing step is alcohol.

4. A method for manufacturing a solid electrolytic capacitor, in which the method comprises the steps of:
    forming a dielectric layer in a surface of an anode body,
    forming a semiconductor layer on the dielectric layer,
    forming an electric conductor layer on the semiconductor layer to obtain a solid electrolytic capacitor element,
    electrically connecting the electric conductor layer to a cathode terminal with an electrically-conductive paste which contains a dispersant;
    immersing the solid electrolytic capacitor element connected to the cathode terminal in a solvent; and then
    encapsulating the solid electrolytic capacitor element with a resin.

5. The method for manufacturing a solid electrolytic capacitor according to claim 4, wherein the solvent used in the immersing step does not dissolve nor swell a binder ontained in the electrically-conductive paste.

6. The method for manufacturing a solid electrolytic capacitor according to claim 4, wherein the solvent used in the immersing step is alcohol.

7. A method for manufacturing a solid electrolytic capacitor, in which the method comprises the steps of:
    forming a dielectric layer in a surface of an anode body;
    forming a semiconductor layer on the dielectric layer;
    forming an electric conductor layer on the semiconductor layer with an electrically-conductive paste which contains a dispersant to obtain a solid electrolytic capacitor element,
    electrically connecting the electric conductor layer to a cathode terminal with an electrically-conductive paste,
    encapsulating the solid electrolytic capacitor element with a resin, and
    adjusting the amount of a dispersant which remains in the electric conductor layer to less than 700 mass ppm, after the electric conductor layer forming step with the electrically-conductive paste which contains a dispersant or the electrically connecting step with the electrically-conductive paste which contains a dispersant and before the encapsulating step.

8. The method for manufacturing a solid electrolytic capacitor according to claim 1, wherein the electric conductor layer includes a layer obtained by using electrically-conductive carbon paste and a layer obtained by using silver paste containing the dispersant.

9. The method for manufacturing a solid electrolytic capacitor according to claim 1, wherein the electrically-conductive paste comprises electrically-conductive powder and vehicle.

10. The method for manufacturing a solid electrolytic capacitor according to claim 9, wherein the vehicle contains a binder.

11. The method for manufacturing a solid electrolytic capacitor according to claim 10, wherein the binder is a methacrylic resin.

12. The method for manufacturing a solid electrolytic capacitor according to claim 1, wherein the dispersant contains a higher fatty acid compound.

13. A solid electrolytic capacitor obtained by the manufacture method according to claim 1.

14. The method for manufacturing a solid electrolytic capacitor according to claim 2, wherein the electric conductor layer includes a layer obtained by using electrically-conductive carbon paste and a layer obtained by using silver paste containing the dispersant.

15. The method for manufacturing a solid electrolytic capacitor according to claim 2, wherein the electrically-conductive paste comprises electrically-conductive powder and vehicle.

16. The method for manufacturing a solid electrolytic capacitor according to claim 15, wherein the vehicle contains a binder.

17. The method for manufacturing a solid electrolytic capacitor according to claim 16, wherein the binder is a methacrylic resin.

18. The method for manufacturing a solid electrolytic capacitor according to claim 2, wherein the dispersant contains a higher fatty acid compound.

19. A solid electrolytic capacitor obtained by the manufacture method according to claim 2.

* * * * *